(12) United States Patent
Ohsawa et al.

(10) Patent No.: US 8,778,539 B2
(45) Date of Patent: Jul. 15, 2014

(54) SECONDARY BATTERY ELECTRODE, AND SECONDARY BATTERY USING THE SAME

(75) Inventors: Yasuhiko Ohsawa, Yokosuka (JP); Mikio Kawai, Yokosuka (JP); Mieko Kawai, legal representative, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1333 days.

(21) Appl. No.: 12/084,691

(22) PCT Filed: Nov. 9, 2006

(86) PCT No.: PCT/JP2006/322347
§ 371 (c)(1),
(2), (4) Date: Oct. 7, 2008

(87) PCT Pub. No.: WO2007/055267
PCT Pub. Date: May 18, 2007

(65) Prior Publication Data
US 2009/0139787 A1    Jun. 4, 2009

(30) Foreign Application Priority Data

Nov. 10, 2005 (JP) ................................. 2005-326746
Oct. 5, 2006 (JP) ................................. 2006-274397

(51) Int. Cl.
*H01M 4/13* (2010.01)
*H01M 4/58* (2010.01)

(52) U.S. Cl.
USPC .................................. 429/231.95; 429/231.3

(58) Field of Classification Search
CPC .................. H01M 4/58; H01M 4/13
USPC ............... 180/68.5; 252/519.15; 429/231.95, 429/209–246
See application file for complete search history.

(56) References Cited

U.S. PATENT DOCUMENTS

| 5,744,258 A | 4/1998 | Bai et al. |
| 6,159,636 A | 12/2000 | Wang et al. |

(Continued)

FOREIGN PATENT DOCUMENTS

| EP | 1 174 937 A1 | 1/2002 | |
| EP | 1193782 A2 * | 4/2002 | ............ H01M 4/48 |

(Continued)

OTHER PUBLICATIONS

English Translation of JP 2003197180 A.*

(Continued)

*Primary Examiner* — Patrick Ryan
*Assistant Examiner* — Kiran Quraishi
(74) *Attorney, Agent, or Firm* — Foley & Lardner LLP

(57) ABSTRACT

A secondary battery electrode, which is formed by stacking an electrode active material layer (I) containing spinel-structured lithium manganate as an electrode active material and an electrode active material layer (II) containing, as an electrode active material, a composite oxide represented by the following Chemical formula (1) in a thickness direction of the electrode, in which the electrode active material layer (I) is disposed in contact with a current collector, and an average particle diameter of the composite oxide is smaller than an average particle diameter of the spinel-structured lithium manganate. In such a way, it is possible to provide a secondary battery electrode capable of realizing a secondary battery excellent in both of a volumetric energy density and a volumetric output density.

$$LiCo_vNi_xMn_yM_zO_2 \qquad (1)$$

19 Claims, 3 Drawing Sheets

(56) References Cited

U.S. PATENT DOCUMENTS

| | | |
|---|---|---|
| 2002/0061443 A1 | 5/2002 | Nakanishi et al. |
| 2002/0164528 A1* | 11/2002 | Sunagawa et al. ......... 429/231.3 |
| 2004/0110063 A1* | 6/2004 | Uchitomi et al. ............ 429/223 |
| 2004/0146781 A1* | 7/2004 | Ohsawa et al. ............... 429/209 |
| 2006/0019152 A1 | 1/2006 | Imachi et al. |
| 2006/0019153 A1 | 1/2006 | Imachi et al. |

FOREIGN PATENT DOCUMENTS

| | | | | |
|---|---|---|---|---|
| JP | 11-025955 A | | 1/1999 | |
| JP | 11-067214 A | | 3/1999 | |
| JP | 2002-151055 A | | 5/2002 | |
| JP | 2003-197180 | * | 7/2003 | .............. H01M 4/48 |
| JP | 2003197180 A | * | 7/2003 | .............. H01M 4/02 |
| JP | 2004-055425 A | | 2/2004 | |
| JP | 2006-032279 A | | 2/2006 | |
| JP | 2006-032280 A | | 2/2006 | |
| JP | 2006-080020 A | | 3/2006 | |
| JP | 2007-026676 A | | 2/2007 | |
| WO | WO 2006071972 A2 | * | 7/2006 | ............ H01M 10/40 |

OTHER PUBLICATIONS

Communication, Supplemental European Search Report in EP Application No. 06832446 dated May 25, 2012.

Hideki Kitao et al., "High-Temperature Storage Performance of Li-Ion Batteries Using a Mixture of Li—Mn Spinal and Li—Ni—Co—Mn Oxide as a Positive Electrode Material", Electrochemical and Solid-State Letters, 2005, pp. A87-A90, vol. 8, No. 2.

* cited by examiner

FIG. 2A

| | EXAMPLE 1 | EXAMPLE 2 | EXAMPLE 3 | EXAMPLE 4 | EXAMPLE 5 | EXAMPLE 6 |
|---|---|---|---|---|---|---|
| POSITIVE ELECTRODE ACTIVE MATERIAL LAYER (I) | | | | | | |
| POSITIVE ELECTRODE ACTIVE MATERIAL | $LiMn_2O_4$ | $LiMn_2O_4$ | $LiMn_2O_4$ | $LiMn_2O_4$ | $LiMn_2O_4$ | $LiMn_2O_4$ |
| AVERAGE PARTICLE DIAMETER (μm) | 20 | 20 | 20 | 20 | 20 | 20 |
| THICKNESS (μm) | 64 | 60 | 67 | 60 | 60 | 64 |
| POSITIVE ELECTRODE ACTIVE MATERIAL LAYER (II) | | | | | | |
| POSITIVE ELECTRODE ACTIVE MATERIAL | $LiNi_{0.8}Co_{0.15}Al_{0.05}O_2$ | $LiNi_{0.8}Co_{0.15}Al_{0.05}O_2$ | $LiNi_{0.8}Co_{0.15}Al_{0.05}O_2$ | $LiNi_{0.5}Mn_{0.5}O_2$ | $LiCo_{1/3}Ni_{1/3}Mn_{1/3}O_2$ | $LiNi_{0.8}Co_{0.15}Al_{0.05}O_2$ |
| AVERAGE PARTICLE DIAMETER (μm) | 2 | 2 | 2 | 3 | 1.5 | 0.4 |
| THICKNESS (μm) | 6 | 10 | 3 | 10 | 10 | 5 |
| RATIO OF VOLUMETRIC OUTPUT DENSITY | 100 | 132 | 85 | 94 | 108 | 126 |
| RATIO OF VOLUMETRIC ENERGY DENSITY | 100 | 89 | 105 | 95 | 93 | 98 |

| | EXAMPLE 7 | EXAMPLE 8 | EXAMPLE 9 | EXAMPLE 10 | COMPARATIVE EXAMPLE 1 | COMPARATIVE EXAMPLE 2 |
|---|---|---|---|---|---|---|
| POSITIVE ELECTRODE ACTIVE MATERIAL LAYER (I) | | | | | | |
| POSITIVE ELECTRODE ACTIVE MATERIAL | $LiMn_2O_4$ | $LiMn_2O_4$ | $LiMn_2O_4$ | $LiMn_2O_4$ | $LiMn_2O_4$ | $LiMn_2O_4$ |
| AVERAGE PARTICLE DIAMETER (μm) | 20 | 20 | 20 | 20 | 2 | 20 |
| THICKNESS (μm) | 64 | 64 | 64 | 67 | 100 | 100 |
| POSITIVE ELECTRODE ACTIVE MATERIAL LAYER (II) | | | | | | |
| POSITIVE ELECTRODE ACTIVE MATERIAL | $LiNi_{0.8}Co_{0.15}Al_{0.05}O_2$ | $LiCo_{0.1}Ni_{0.45}Mn_{0.45}O_2$ | $LiCo_{0.2}Ni_{0.4}Mn_{0.4}O_2$ | $LiCo_{0.16}Ni_{0.42}Mn_{0.42}O_2$ | NONE | NONE |
| AVERAGE PARTICLE DIAMETER (μm) | 1.1 | 2.2 | 2 | 3.1 | | |
| THICKNESS (μm) | 9 | 7 | 7 | 9 | | |
| RATIO OF VOLUMETRIC OUTPUT DENSITY | 137 | 102 | 99 | 97 | 110 | 35 |
| RATIO OF VOLUMETRIC ENERGY DENSITY | 90 | 91 | 87 | 90 | 45 | 105 |

FROM FIG. 2A

SECONDARY BATTERY ELECTRODE, AND SECONDARY BATTERY USING THE SAME

TECHNICAL FIELD

The present invention relates to a secondary battery electrode, and more specifically, relates to a secondary battery electrode capable of providing a high-capacity and high-output secondary battery.

BACKGROUND ART

In recent years, as the air pollution by automotive exhaust gas has been becoming a global problem, an electric vehicle that uses electricity as a power source, a hybrid vehicle that runs by combining an engine and a motor, a fuel cell electric vehicle that uses a fuel cell as a power source, and the like have attracted attention, and a high-capacity and high-output battery mounted on these has occupied an industrially important position. Moreover, also in an automobile that draws power only from the engine, a vehicle that mounts thereon a high-voltage battery enabling a variety of electric instruments to be mounted on the vehicle concerned has been put into practical use. A secondary battery such as a lithium-ion secondary battery is considered to be a battery suitable for such a vehicle since the secondary battery exerts high performance in terms of capacity and output, and a variety of developments are progressed therefor.

Basically, the lithium-ion secondary battery has a configuration in which positive and negative electrodes capable of occluding and emitting Li ions are arranged while interposing a separator therebetween, and these are filled with an electrolyte. The separator is made of a porous one having electrical insulating properties, and is used for the purpose of preventing an internal short circuit that occurs by the fact that that the positive electrode and the negative electrode contact each other, and so on.

In the case of performing charge and discharge in such a battery, when the battery discharges, lithium as a negative electrode component is emitted as the Li ions to the electrolyte, and in the positive electrode, the Li ions are occluded from the electrolyte, whereby electric power is generated. Meanwhile, when the battery charges, the Li ions are emitted from the positive electrode to the electrolyte, and the Li ions in the electrolyte are occluded to the negative electrode. At the same time when the Li ions go out of and come into the electrolyte as described above, electrons from a current collector move through a conductive additive, whereby an electrode reaction progresses, and the charge and the discharge are performed.

A secondary battery for use in a power source for an automobile such as the hybrid vehicle is required to have a large output for a fixed time, that is, a high volumetric output density in order to perform power assistance when the engine starts and the vehicle starts and accelerates. Accordingly, for the purpose of further increasing the output of the secondary battery, as disclosed in Japanese Patent Laid-Open Publication No. 2002-151055, a method is used, which is for enhancing electron conductivity and lithium ion diffusibility in an electrode active material layer while increasing an electrode reaction area by reducing an average particle diameter of an electrode active material and thinning a thickness of the electrode active material layer in the electrode.

Moreover, in Japanese Patent Laid-Open Publication No. 2002-151055, for the purpose of further enhancing the output density of the secondary battery, there is disclosed a secondary battery, in which the active material layer is formed into a structure of two layers different in active material particle diameter, the active material particle diameter of the active material layer on the current collector side is set at 0.1 μm or more to less than 5 μm, and the active material particle diameter of the active material layer on the separator side is set at 5 to 20 μm.

As described above, in the conventional secondary battery, the output thereof is increased by using the electrode active material that is so particularly finely processed that the average particle diameter thereof can be 10 μm or less. However, there has been a problem that such fine processing of the electrode active material causes an increase of an electrode volume, bringing a decrease of an obtained volumetric energy density of the secondary battery.

Moreover, in the case where the secondary battery is used as the power source of the vehicle, and the like, the secondary battery is desired to have a high volumetric energy density in order to further extend a running distance, as well as to have a high volumetric output density, in order to exert excellent output performance. In the secondary battery using the active material layer formed into the structure of two layers different in active material particle diameter, which is disclosed in Japanese Patent Laid-Open Publication No. 2002-151055, though the output density thereof can be enhanced, further enhancement of the volumetric energy density is desired in order to further extend the running distance of the vehicle.

As described above, it is a current situation that the secondary battery is still desired to further enhance the volumetric energy density and the volumetric output density. In this connection, it is an object of the present invention to provide a secondary battery electrode capable of realizing a secondary battery excellent in both of the volumetric energy density and the volumetric output density.

DISCLOSURE OF THE INVENTION

As a result of a variety of examinations, the inventors of the present invention have found out that the above-described object can be achieved in such a manner that spinel-structured lithium manganate and a composite oxide having a predetermined composition are used as such electrode active materials, and that particle diameters, arrangement and the like in a secondary battery electrode made of these are optimized.

Specifically, the present invention achieves the above-described object by a secondary battery electrode, which is formed by stacking an electrode active material layer (I) containing spinel-structured lithium manganate as an electrode active material and an electrode active material layer (II) containing, as an electrode active material, a composite oxide represented by the following Chemical formula (1) in a thickness direction of the electrode, in which the electrode active material layer (I) is disposed in contact with a current collector, and an average particle diameter of the composite oxide is smaller than an average particle diameter of the spinel-structured lithium manganate:

$$LiCo_vNi_xMn_yM_zO_2 \qquad (1)$$

(where M is at least one type selected from the group consisting of Al, Ga and In, V represents an atomic ratio of Co, and is in a range of: $0 \le V \le 0.5$, X represents an atomic ratio of Ni, and is in a range of: $0.3 \le X < 1.0$, Y represents an atomic ratio of Mn, and is in a range of: $0 \le Y \le 0.5$, Z represents an atomic ratio of M, and is in a range of: $0 \le Z \le 0.1$, and v+x+y+z is equal to 1.)

BRIEF DESCRIPTION OF THE DRAWINGS

FIG. 2A shows evaluation results of secondary batteries fabricated in Examples 1 to 6.

FIG. 2B shows evaluation results of secondary batteries fabricated in Examples 7 to 10 and Comparative examples 1 and 2.

BEST MODE FOR CARRYING OUT THE INVENTION

Figure 1:
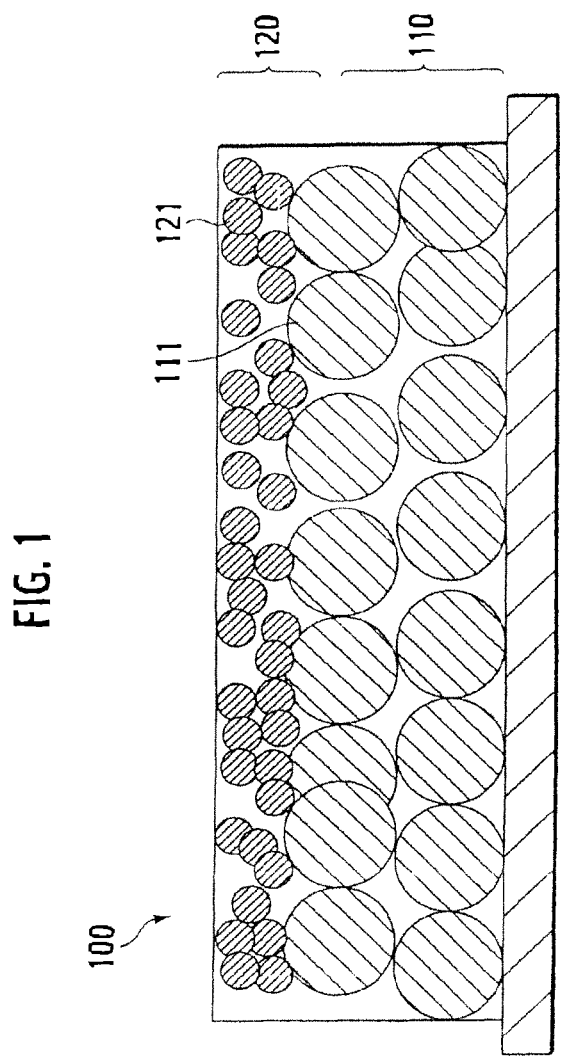
FIG. 1 shows a schematic cross-sectional view of a secondary battery electrode of the present invention.

A first one of the present invention is a secondary battery electrode, which is formed by stacking an electrode active material layer (I) containing spinel-structured lithium manganate as an electrode active material and an electrode active material layer (II) containing, as an electrode active material, a composite oxide represented by the following Chemical formula (1) in a thickness direction of the electrode, in which the electrode active material layer (I) is disposed in contact with a current collector, and an average particle diameter of the composite oxide is smaller than an average particle diameter of the spinel-structured lithium manganate:

$$LiCo_V Ni_X Mn_Y M_Z O_2 \quad (1)$$

(where M is at least one type selected from the group consisting of Al, Ga and In, V represents an atomic ratio of Co, and is in a range of: $0 \leq V \leq 0.5$, X represents an atomic ratio of Ni, and is in a range of: $0.3 \leq X < 1.0$, Y represents an atomic ratio of Mn, and is in a range of: $0 \leq Y \leq 0.5$, Z represents an atomic ratio of M, and is in a range of: $0 \leq Z \leq 0.1$, and v+x+y+z is equal to 1.)

Since the spinel-structured lithium manganate is found at more places as compared with lithium cobaltate, and cost thereof is also low, the spinel-structured lithium manganate is stably suppliable and is particularly superior in terms of upsizing the secondary battery. Hence, in the present invention, it was examined to enhance a volumetric output density and volumetric energy density of the secondary battery by using such spinel-structured lithium manganate as the electrode active material. As a result, it has been found out that the spinel-structured lithium manganate having a usual average particle diameter and the finely processed composite oxide having the above-described Chemical formula (1) are used as the electrode active materials, thus making it possible to enhance the volumetric output density to a large extent by the composite oxide while ensuring the volumetric energy density by the spinel-structured lithium manganate.

Moreover, in the secondary battery electrode of the present invention, the electrode active material layer is formed into a structure of two layers toward the thickness direction of the electrode, and the spinel-structured lithium manganate and the composite oxide are arranged individually in the respective layers. Specifically, as shown in FIG. 1, the secondary battery electrode 100 of the present invention has a configuration in which the electrode active material layer (I) 110 containing the spinel-structured lithium manganate 111 as the electrode active material and the electrode active material layer (II) 120 containing, as the electrode active material, the composite oxide 121 represented by the above-described Chemical formula (1) are stacked in the thickness direction of the electrode 100.

Note that, though FIG. 1 is a schematic cross-sectional view of the secondary battery electrode of the present invention, and besides the electrode active materials, other electrode constituent materials such as an electrolyte can be contained in the electrode active material layers (I) and (II), a description of the other electrode constituent materials is omitted for convenience of the explanation.

In the electrode of the present invention, the electrode active material layer (I) is disposed on the current collector side, and the electrode active material layer (II) is disposed on a surface side of the electrode. In such a way, when charge and discharge at a large current are performed, an electrode reaction occurs preferentially by the finely processed composite oxide contained in the electrode active material layer (II), thus making it possible to further enhance the volumetric output density of the electrode. At the same time, the volumetric energy density of the electrode can be ensured by the spinel-structured lithium manganate contained in the electrode active material layer (I).

Hence, in accordance with the present invention, the spinel-structured lithium manganate and the composite oxide having the predetermined composition are used as the electrode active materials, and particle diameters, arrangement and the like in the secondary battery electrode made of these are optimized, thus making it possible to provide a secondary battery electrode excellent in both of the volumetric energy density and the volumetric output density. Moreover, the composite oxide represented by the above-described Chemical formula (1) has a lamellar crystal structure, and accordingly, a diffusion route of the lithium in the composite oxide is two-dimensional. Therefore, the above-described composite oxide is excellent in the volumetric output density of the electrode, and in addition, is also excellent in durability at a high temperature of 50° C. or more. Hence, the composite oxide represented by the above-described Chemical formula (1) is used, thus also making it possible to suppress an increase of an internal resistance of the battery owing to a deterioration of the electrode active materials.

A description will be sequentially made below of specific configurations of the secondary battery electrode of the present invention.

The secondary battery electrode of the present invention uses the spinel-structured lithium manganate ($LiMn_2O_4$) as the electrode active material.

Moreover, besides the spinel-structured lithium manganate, the secondary battery electrode of the present invention uses, as the electrode active material, the composite oxide represented by the following Chemical formula (1):

$$LiCo_V Ni_X Mn_Y M_Z O_2 \quad (1)$$

In the above-described Chemical formula (1), M is at least one type selected from the group consisting of Al, Ga and In. Among them, Al is preferably mentioned as M since an effect that the structure is stabilized in the charging and the discharging is obtained thereby.

Moreover, in the above-described Chemical formula (1), V represents the atomic ratio of Co, and is in the range of: $0 \leq V \leq 0.5$, X represents the atomic ratio of Ni, and is in the range of: $0.3 \leq X < 1.0$, Y represents the atomic ratio of Mn, and is in the range of: $0 \leq Y \leq 0.5$, and Z represents the atomic ratio of M, and is in the range of: $0 \leq Z \leq 0.1$. However, it is preferable that the ranges of V and X be $0 \leq V \leq 0.3$ and $0.3 \leq X < 0.8$, respectively, from a viewpoint of ensuring cycle stability without causing a decrease of the capacity.

Moreover, as the composite oxide represented by the above-described Chemical formula (1), specifically, ones having compositions of $LiNi_{0.8}Co_{0.15}Al_{0.05}O_2$, $LiNi_{0.5}Mn_{0.5}O_2$, $LiCo_{1/3}Ni_{1/3}Mn_{1/3}O_2$, $LiCo_{0.1}Ni_{0.45}Mn_{0.45}O_2$, $LiCo_{0.2}Ni_{0.4}Mn_{0.4}O_2$, $LiCo_{0.16}Ni_{0.42}Mn_{0.42}O_2$, and the like are preferably mentioned. In the case of using the composite oxides having these compositions, the volumetric output density of the secondary battery electrode can be further enhanced.

The composite oxide having the composition represented by the above-described Chemical formula (1) can be fabricated by appropriately referring to a publicly known method. For example, a method of mixing a compound containing a desired metal element as well as a lithium compound and firing an obtained mixture, and the like are used.

Note that, in the present invention, the composition of the electrode active material can be measured by analyzing the composition concerned by inductively coupled plasma optical emission spectrometry.

In the secondary battery electrode of the present invention, the average particle diameter of the composite oxide is made smaller than the average particle diameter of the spinel-structured lithium manganate. In such a way, the secondary battery electrode excellent in both of the volumetric energy density and the volumetric output density is obtained.

Specifically, it is preferable that the average particle diameter of the composite oxide be set at $1/1000$ to $1/3$ of the average particle diameter of the spinel-structured lithium manganate, more preferably at $1/50$ to $1/5$.

From a viewpoint of enhancing the volumetric output density of the secondary battery electrode, it is recommended that the average particle diameter of the composite oxide be set at preferably 0.01 to 5 μm, more preferably 0.1 to 3 μm, particularly preferably 0.4 to 2 μm.

Moreover, from a viewpoint of ensuring the volumetric energy density of the secondary battery electrode, it is recommended that the average particle diameter of the spinel-structured lithium manganate be set at preferably 5 to 100 μm, more preferably 10 to 50 μm, particularly preferably at 20 to 30 μm.

Note that, in the present invention, the average particle diameters of the electrode active materials can be measured by laser diffraction particle size distribution measurement and dynamic light scattering.

In the secondary battery electrode of the present invention, the electrode active material layers (I) and (II) contain the above-described spinel-structured lithium manganate and composite oxide as the electrode active materials. Besides these, a conductive additive for enhancing electron conductivity, a binder, an electrolyte and the like can be contained in each of the layers.

As the electrolyte, a non-aqueous electrolyte using an organic solvent is preferably mentioned. In such a way, ion conduction in the positive electrode active material layer becomes smooth, and the output of the entire battery can be enhanced.

The non-aqueous electrolyte may be any of a liquid electrolyte (electrolytic solution), a solid electrolyte, and a polymer gel electrolyte. Although a preferable example of the non-aqueous electrolyte is shown below, the non-aqueous electrolyte just needs to be one for use in the usual secondary battery, and no particular limitations are imposed thereon.

As the electrolytic solution, ones or the like can be used, which contain at least one type of electrolyte salt selected from among inorganic acid anion salt such as LiBOB (lithium bis oxide borate), $LiPF_6$, $LiBF_4$, $LiClO_4$, $LiAsF_6$, $LiTaF_6$, $LiAlCl_4$ and $Li_2B_{10}C_{10}$ and organic acid anion salt such as $LiCF_3SO_3$, $Li(CF_3SO_2)_2N$ and $Li(C_2F_5SO_2)_2$, and use an organic solvent (plasticizer) such as a non-protonic solvent, in which at least one or two or more selected from among: cyclic carbonates such as propylene carbonate (PC) and ethylene carbonate (EC); chain carbonates such as dimethyl carbonate, methyl ethyl carbonate and diethyl carbonate; ethers such as tetrahydrofuran, 2-methyltetrahydrofuran, 1,4-dioxane, 1,2-dimethoxyethane and 1,2-dibutoxyethane; lactones such as γ-butyrolactone; nitrites such as acetonitrile; esters such as methyl propionate; amides such as dimethylformamide; methyl acetate; and methyl formate, are mixed.

The solid electrolyte is not particularly limited as long as it is composed of a polymer having the ion conductivity. For example, polyethylene oxide (PEO), polypropylene oxide (PPO), copolymers of these, and the like are mentioned. Such polyalkylene oxide-series polymers can dissolve the above-described electrolyte salts well. Moreover, the polyalkylene oxide-series polymers form a cross-linking structure, whereby excellent mechanical strength is exerted.

The polymer gel electrolyte is not particularly limited. However, there are mentioned: one in which an electrolytic solution is contained in an ion-conductive polymer for the electrolyte; one in which a similar electrolyte is held in a skeleton of a non-ion-conductive polymer for the electrolyte; and the like.

The electrolytic solution contained in the polymer gel electrolyte is similar to the above-described one. Moreover, as the ion-conductive polymer for the electrolyte, the above-described polymer electrolyte and the like are used. As the non-ion-conductive polymer for the electrolyte, for example, a monomer or a polymer can be used, which forms a gelled polymer such as polyvinylidene fluoride (PVDF), polyvinyl chloride (PVC), polyacrylonitrile (PAN) and polymethylmethacrylate (PMMA). However, the non-ion-conductive polymer is not limited to these. Note that the PAN, the PMMA and the like rather belong to the category of little ion conductivity, and accordingly, can also be defined as the ion-conductive polymers for the electrolyte; however, are illustrated here as the non-ion-conductive polymers for the electrolyte, which are used for the polymer gel electrolyte.

A ratio (mass ratio) of the polymer (host polymer) for the electrolyte and the electrolytic solution in the polymer gel electrolyte just needs to be decided in response to a usage purpose and the like thereof; however, is in a range of 2:98 to 90:10. In such a way, seepage of the electrolyte from an outer circumferential portion of the positive electrode active material layer can also be sealed effectively by providing an insulating layer or an insulated portion. Therefore, the ratio (mass ratio) of the host polymer and the electrolytic solution in the above-described polymer gel electrolyte can also be set so that priority can be relatively given to battery characteristics.

A content of the composite oxide in the electrode active material layer (II) is not particularly limited; however, preferably, is 40 to 90 mass % with respect to a dry weight of the electrode active material layer (II). However, it is desirable that, with regard to the secondary battery electrode of which output is increased, a network of electron conduction be formed throughout an inside of the electrode, thus enabling all the fine and minute active materials to effectively contribute to the reaction. Accordingly, it is desirable to suitably increase an amount of the conductive additive in response to a reduction of the particle diameter of the electrode active material.

Moreover, a content of the spinel-structured lithium manganate in the electrode active material layer (I) is not particularly limited; however, it is recommended that the content be preferably 90 to 98 mass %, more preferably 95 to 98 mass % with respect to a dry weight of the electrode active material layer (I). However, an amount of the binder, which is sufficient for maintaining the form of the electrode, and the conductive additive that enables the reaction, are essential. In such a way, the volumetric energy density of the secondary battery electrode can be ensured sufficiently.

In the secondary battery electrode of the present invention, a thickness of the electrode active material layer (II) is not particularly limited; however, a thinner thickness is preferable from the viewpoint of enhancing the volumetric output density of the secondary battery electrode. Specifically, it is preferable to set the thickness of the electrode active material layer (II) at 2 to 30% of a thickness of the electrode active material layer (I).

From the viewpoint of enhancing the volumetric output density of the secondary battery electrode by shortening the diffusion route of the lithium ions, it is recommended that the thickness of the electrode active material layer (II) be set at preferably 0.6 to 90 μm, more preferably 1 to 40 μm, particularly preferably 2 to 20 μm.

Moreover, from the viewpoint of ensuring the volumetric energy density of the secondary battery electrode, it is recommended that the thickness of the electrode active material layer (I) be set at preferably 30 to 300 μm, more preferably 40 to 150 μm.

A porosity of the electrode active material layer (II) is not particularly limited. However, it is recommended that the porosity be set at preferably 30 to 60%, more preferably 35 to 45% in order to reduce a diffusion resistance of the lithium ions by ensuring gaps, and to thereby enhance the volumetric output density of the secondary battery electrode.

Moreover, a porosity of the electrode active material layer (I) is not particularly limited. However, it is recommended that the porosity be preferably set at 25 to 40% from a viewpoint of filling the electrode active material as densely as possible.

Note that the thickness of each of the electrode active material layers can be measured by observing a cross section of the secondary battery electrode by using a scanning electron microscope (SEM) and the like. The porosity of each of the electrode active material layers can be calculated from the thickness of the secondary battery electrode, a usage amount of each of the constituent materials, and a density of each thereof.

With regard to the structure of the secondary battery electrode of the present invention, the electrode active material layers (I) and (II) are formed on at least one surface of the current collector, and at this time, the electrode active material layer (I) is disposed so as to contact the current collector.

The current collector is not particularly limited as long as it is used in the conventional secondary battery, and just needs to be composed of a conductive material such as aluminum, copper, stainless steel (SUS), titanium, and nickel. A thickness of the current collector just needs to be approximately 10 to 50 μm.

The above-described secondary battery electrode of the present invention can make the best possible use of the above-described variety of characteristics, and accordingly, it is preferable that the secondary battery electrode be used as a secondary battery positive electrode.

Moreover, when the secondary battery electrode of the present invention is used for a bipolar battery and the like, the secondary battery electrode may be a bipolar electrode having a structure, in which the above-described positive electrode active material layers (I) and (II) of the present invention are formed on one surface of the current collector, and a negative electrode active material layer containing a conventionally general negative electrode material is formed on the other surface. It is desirable that the structure of the electrode be decided in accordance with a usage purpose thereof.

A second one of the present invention is a secondary battery using, as a positive electrode, the above-described secondary battery electrode that is the first one of the present invention. In accordance with the present invention, the secondary battery electrode that is the first one thereof is used, thus making it possible to provide a secondary battery excellent in both of the volumetric energy density and the volumetric output density.

For a configuration of the secondary battery, technologies conventionally known in public can be referred to as appropriate except that the secondary battery electrode that is the first one of the present invention is used as the positive electrode. For example, a secondary battery or the like is mentioned, which includes a positive electrode, a negative electrode, a separator, and an electrolyte, wherein the positive electrode that is the second one of the present invention is used as the above-described positive electrode.

The negative electrode for use in the secondary battery of the present invention is not particularly limited, and may be a negative electrode conventionally used in general. Specifically, the negative electrode is a negative electrode having a conventional configuration formed in such a manner that the negative electrode active material layer containing at least the negative electrode active material is applied on the current collector made of copper, nickel titanium, SUS and the like.

As the negative electrode active material, carbon is preferably used since the carbon can further enhance the durability and the like of the secondary battery as well as the volumetric energy density and volumetric output density thereof. Specifically, the carbon is artificial or natural graphites with a variety of shapes such as a scaly shape, a fiber shape, a spherical shape, a pseudospherical shape, a block shape, and a whisker shape. Especially, the carbon is one, in which an interplane distance ($d_{002}$) of a crystal lattice is 0.34 nm or less, and a crystallite dimension (Lc) in a c-axis direction is 10 nm or more. Note that the interplane distance ($d_{002}$) of the crystal lattice and the crystallite dimension (Lc) in the c-axis direction can be measured in accordance with the Law for Japan Society for the Promotion of Science. Besides the above, soft carbons and hard carbons, of which grades are various, can be used.

The secondary battery of the present invention is obtained in such a manner that the positive electrode and the negative electrode are superposed on each other while interposing the separator therebetween, and that the electrolyte is impregnated into such a superposed object.

As the separator for use in the secondary battery of the present invention, one conventionally used in general can be used without being particularly given limitations. For example, there are mentioned polyolefin-series resin porous film such as a microporous polyethylene film, a microporous polypropylene film, and a microporous ethylene-propylene copolymer film, or polyolefin-series resin unwoven fabric, a stacked body of these, and the like. These have an excellent effect that reactivity thereof with the electrolyte (electrolytic solution) can be suppressed to be low. Besides the above, there are also mentioned: a composite resin film, in which the polyolefin-series resin unwoven fabric or the polyolefin-series resin porous film is used as a reinforcement material layer, and a compound of vinylidene fluoride resin is filled into the reinforcement material layer; and the like. Moreover, an electrolyte layer made of the solid electrolyte, the polymer gel electrolyte, and the like may be employed instead of the separator.

A thickness of the separator just needs to be decided as appropriate in response to a usage purpose thereof; however, just needs to be set at approximately 15 to 50 μm when the separator is used for a secondary battery for driving a motor of an automobile and the like. Moreover, a porosity, size and the like of the separator just need to be decided as appropriate in consideration for characteristics of the obtained secondary battery.

As the electrolyte impregnated into the separator, one similar to the one for use in the positive electrode active material layer is mentioned, and such an electrolyte is as described in the first one of the present invention.

The positive electrode, the negative electrode and the separator are housed in a battery case and the like. As the battery case, it is recommended to use one capable of preventing an external impact and an environmental degradation in the case of using the battery. For example, the battery case is fabricated in such a manner that a laminated material in which a polymer film and metal foil are compositely stacked is used, and that circumferential portions thereof are joined to each other by thermal fusing, or that an opening portion of a bag formed of the laminated material is thermally fused. In such a way, the battery case concerned is hermetically sealed. The battery case is formed into a structure in which a positive electrode lead terminal and a negative electrode lead terminal are drawn out of such a thermally fused portion. At this time, a spot from which each of the positive and negative electrode lead terminals is drawn out is not particularly limited to one spot. Moreover, the material that composes the battery case is not limited to the above-described one, and it is possible to employ plastics, metal, rubber, and the like, or materials made by combining these, and as for a shape thereof, it is possible to use ones with a film shape, a plate shape, a box shape, and the like. Furthermore, a method can also be applied, in which a terminal that establishes conduction between an inside and outside of the case is provided, the current collector is connected to an inside of the terminal concerned, and a lead terminal is connected to an outside of the terminal concerned, whereby a current is taken out.

A structure of the secondary battery of the present invention is not particularly limited. In the case of classifying the secondary battery by form/structure thereof, the structure of the secondary battery of the present invention is applicable to any form/structure conventionally known in public, such as those of a stacked-type battery and a wound-type battery. Moreover, in the case of viewing the structure concerned in terms of an electrical connection form in the secondary battery, the structure of the secondary battery of the present invention is applicable to both of a battery of an internal parallel connection type, which is not of a bipolar type, and a battery of an internal serial connection type, which is of the bipolar type. Preferably, the secondary battery of the present invention is the battery of the bipolar type. As compared with a usual battery, a battery superior in capacity and output characteristics, in which a voltage of a single cell is higher, can be composed.

From a viewpoint of practical use, it is preferable to use the above-described secondary battery according to the present invention as a lithium-ion secondary battery; however, besides this, the secondary battery according to the present invention can also be applicable as secondary batteries such as a sodium-ion secondary battery, a potassium-ion secondary battery, a magnesium-ion secondary battery, and a calcium-ion secondary battery.

Moreover, the secondary battery of the present invention can be formed into an assembled battery in which a plurality of the secondary batteries are connected to one another. Specifically, at least two or more of the secondary batteries of the present invention are used and connected in series and/or parallel to be formed into the assembled battery, whereby a high-capacity and high-output battery module can be formed. Accordingly, it becomes possible to cope with requirements for the battery capacity and the output for each usage purpose at relatively low cost.

Specifically, for example, N pieces of the above-described secondary batteries are connected in parallel, M sets of the N pieces of secondary batteries connected in parallel are further connected in series, and are housed in a metal-made or resin made assembled battery case, whereby the assembled battery is formed. In this case, the numbers of the secondary batteries connected in series/parallel are decided in response to the usage purpose. For example, the numbers just need to be combined so that the assembled battery can be applied to a power source for driving the a vehicle, for which a high energy density and a high output density are required as a large-capacity power source for an electric vehicle (EV), a hybrid electric vehicle (HEV) and the like. Moreover, a positive electrode terminal and a negative electrode terminal for the assembled battery just need to be electrically connected to electrode leads of the respective secondary batteries by using lead wires and the like. Moreover, in the case of interconnecting the secondary batteries in series/parallel, the secondary batteries just need to be electrically interconnected by using appropriate connecting members such as spacers and busbars. However, the assembled battery of the present invention is not limited to the one described here, and ones conventionally known in public can be employed as appropriate. Moreover, a variety of measurement instruments and control instruments may be provided in the assembled battery concerned in response to the usage purpose. For example, a voltage measuring connector and the like may be provided in advance in order to monitor a voltage of the battery, and so on, and as such, no particular limitations are imposed thereon.

As described above, the secondary battery and assembled battery of the present invention have excellent volumetric energy densities and volumetric output densities. Hence, the secondary battery and assembled battery of the present invention are suitable as a battery or a driving power source, which is for use in the vehicle for which strict requirements regarding the capacity and output characteristics are especially made, for example, in automobiles such as the electric vehicle, a fuel cell electric vehicle, and the hybrid electric vehicle. In such a way, the secondary battery and assembled battery of the present invention can provide a vehicle excellent in running performance. Moreover, since a vehicle cabin space and a trunk room can be widely ensured, it is convenient that the secondary battery and/or assembled battery of the present invention are mounted as the driving power source under a seat at a center portion of a vehicle body of the electric vehicle or the hybrid electric vehicle. However, the present invention is not limited at all to the above-described mounted position of the secondary battery and/or the assembled battery. The secondary battery or assembled battery of the present invention can be installed under a floor of the vehicle, in insides of the trunk room, an engine room, a roof and a hood, and the like.

EXAMPLES

A description will be specifically made below of the present invention based on examples. Note that the present invention is not limited only to these examples.

Example 1

1. Fabrication of Positive Electrode Active Material Layer (I)

First, spinel-structured lithium manganate ($LiMn_2O_4$; average particle diameter: 20 μm), acetylene black, and PVdF were mixed together so that a mass ratio thereof could be 92:4:4, and an appropriate amount of NMP (N-methyl-2-pyrrolidone) was added to an obtained mixture, followed by sufficient stirring/mixing in a homogenizer, whereby slurry (1) was prepared. A fixed amount of the slurry (1) was applied on aluminum foil (thickness: 20 μm; and width: 200 mm) by using a die coater, and was dried, followed by pressing by a roll press. In such a way, the positive electrode active material layer (I) (thickness: 64 μm) was formed on the aluminum foil.

2. Fabrication of Positive Electrode Active Material Layer (II)

Next, a composite oxide (average particle diameter: 2 μm) represented by $LiNi_{0.8}Co_{0.15}Al_{0.05}O_2$, the acetylene black, and the PVdF were mixed together so that a mass ratio thereof could be 80:10:10, and an appropriate amount of the NMP (N-methyl-2-pyrrolidone) was added to an obtained mixture, followed by sufficient stirring/mixing in the homogenizer, whereby slurry (2) was prepared. A fixed amount of the slurry (2) was applied by using the die coater on the positive electrode active material layer (I) fabricated previously, and was dried, followed by pressing by the roll press. In such a way, the positive electrode active material layer (II) (thickness: 6 μm) was formed on the positive electrode active material layer (I). A portion on which these positive electrode active material layers were applied was cut out so that a dimension thereof could be 50 mm×100 mm, and the cutout portion was formed as the positive electrode.

3. Fabrication of Negative Electrode Active Material Layer

Hard carbon (average particle diameter: 3 μm) and the PVdF were mixed together so that a mass ratio thereof could be 90:10, and an appropriate amount of the NMP (N-methyl-2-pyrrolidone) was added to an obtained mixture, followed by sufficient stirring/mixing in the homogenizer, whereby slurry was prepared. A fixed amount of the slurry was applied on copper foil (thickness: 15 μm; and width: 200 mm) by using the die coater, and was dried, followed by pressing by the roll press. In such a way, the negative electrode active material layer (thickness: 65 μm) was formed on the copper foil. A portion on which the negative electrode active material layer was applied was cut out so that a dimension thereof could be 55 mm×105 mm, and the cutout portion was formed as the negative electrode.

4. Fabrication of Secondary Battery

The positive electrode and the negative electrode, which were fabricated in the above-described manner, were dried for one day in a vacuum dryer of 90° C. Thereafter, 10 pieces of the positive electrodes and 11 pieces of the negative electrodes were stacked alternately so that the electrode active material layers (I) could be arranged on the negative electrode side while interposing polypropylene porous films (thickness: 25 μm) between the positive electrodes and the negative electrodes. Then, the respective positive electrodes and negative electrodes were bundled together, leads were welded thereto, and a structure was formed, in which the leads of the positive and negative electrodes were drawn out of a stacked body thus formed. Thereafter, the structure was housed in a laminate film bag of aluminum, an electrolytic solution was injected thereinto by an injector, and the structure was sealed under a reduced pressure, whereby a battery was fabricated.

Example 2

A secondary battery was fabricated in a similar way to Example 1 except that the thickness of the electrode active material layer (I) was set at 60 μm, and that the thickness of the electrode active material layer (II) was set at 10 μm.

Example 3

A secondary battery was fabricated in a similar way to Example 1 except that the thickness of the electrode active material layer (I) was set at 67 μm, and that the thickness of the electrode active material layer (II) was set at 3 μm.

Example 4

A secondary battery was fabricated in a similar way to Example 1 except that the thickness of the electrode active material layer (I) was set at 60 μm, that the thickness of the electrode active material layer (II) was set at 10 μm, and that a composite oxide (average particle diameter: 3 μm) represented by $LiCo_{1/3}Ni_{1/3}Mn_{1/3}O_2$ was used in the electrode active material layer (II).

Example 5

A secondary battery was fabricated in a similar way to Example 1 except that the thickness of the electrode active material layer (I) was set at 60 μm, that the thickness of the electrode active material layer (II) was set at 10 μm, and that a composite oxide (average particle diameter: 1.5 μm) represented by $LiCo_{1/3}Ni_{1/3}Mn_{1/3}O_2$ was used in the electrode active material layer (II).

Example 6

A secondary battery was fabricated in a similar way to Example 1 except that, in Example 1, the active material of the electrode active material layer (II) was changed from $LiNi_{0.8}Co_{0.15}Al_{0.05}O_2$ with an average particle diameter of 2 μm to $LiNi_{0.8}Co_{0.15}Al_{0.05}O_2$ with an average particle diameter of 0.4 μm, and the thickness of the electrode active material layer (II) was changed from 6 μm to 5 μm.

Example 7

A secondary battery was fabricated in a similar way to Example 1 except that, in Example 1, the active material of the electrode active material layer (II) was changed from $LiNi_{0.8}Co_{0.15}Al_{0.05}O_2$ with an average particle diameter of 2 μm to $LiNi_{0.8}Co_{0.15}Al_{0.05}O_2$ with an average particle diameter of 1.1 μm, and the thickness of the electrode active material layer (II) was changed from 6 μm to 9 μm.

Example 8

A secondary battery was fabricated in a similar way to Example 1 except that, in Example 1, the active material of the electrode active material layer (II) was changed from $LiNi_{0.8}Co_{0.15}Al_{0.05}O_2$ with an average particle diameter of 2 μm to $LiCo_{0.1}Ni_{0.45}Mn_{0.45}O_2$ with an average particle diameter of 2.2 μm, and the thickness of the electrode active material layer (II) was changed from 6 μm to 7 μm.

Example 9

A secondary battery was fabricated in a similar way to Example 1 except that, in Example 1, the active material of the electrode active material layer (II) was changed from $LiNi_{0.8}Co_{0.15}Al_{0.05}O_2$ with an average particle diameter of 2 μm to $LiCo_{0.2}Ni_{0.4}Mn_{0.4}O_2$ with an average particle diameter of 2.0 μm, and the thickness of the electrode active material layer (II) was changed from 6 μm to 7 μm.

Example 10

A secondary battery was fabricated in a similar way to Example 3 except that, in Example 3, the active material of the electrode active material layer (II) was changed from LiNi$_{0.8}$Co$_{0.15}$Al$_{0.05}$O$_2$ with an average particle diameter of 2 μm to LiCo$_{0.16}$Ni$_{0.42}$Mn$_{0.4}$O$_2$ with an average particle diameter of 3.1 μm, and the thickness of the electrode active material layer (II) was changed from 3 μm to 9 μm.

Comparative Example 1

A secondary battery was fabricated in a similar way to Example 1 except that spinel-structured lithium manganate (LiM$_2$O$_4$; average particle diameter: 2 μm) was used in the electrode active material layer (I), that the thickness of the electrode active material layer (I) was set at 100 μm, and that the electrode active material layer (II) was not fabricated.

Comparative Example 2

A secondary battery was fabricated in a similar way to Example 1 except that the thickness of the electrode active material layer (I) was set at 100 μm, and that the electrode active material layer (II) was not fabricated.

(Evaluations)

Evaluations of the secondary batteries fabricated in the respective Examples and Comparative examples were performed in accordance with the following procedure. The charge and the discharge were performed at room temperature, and the charge was performed to 4.15V in a constant current-constant voltage mode of 1 A for 2.5 hours in total. With regard to the discharge, constant current discharge was performed at 1 A to a cutoff voltage of 2.5V to measure a discharge capacity, and an energy density per volume was calculated. With regard to measurement of the battery output, low-current discharge was performed after the charge, and there was calculated a product of such a maximum current value, at which the battery terminal voltage in 10 seconds from start of the low-current discharge does not fall below 2.5V, and of a terminal voltage at this time. The product thus calculated was defined as an output density per volume.

In FIG. 2A and FIG. 2B, for comparison, the volumetric energy density and volumetric output density of the battery of Example 1 were individually set at 100 to be used as a reference, and data of the other Examples and Comparative examples were shown as relative values.

As shown in FIG. 2A and FIG. 2B, it is understood that, in accordance with the present invention, the volumetric energy density of the secondary battery can be enhanced without decreasing the volumetric energy density thereof while keeping on maintaining the merit of the spinel lithium manganate excellent in material cost.

Industrial Applicability

In accordance with the present invention, it becomes possible to provide a secondary battery electrode capable of realizing a secondary battery that is excellent in both of the volumetric energy density and the volumetric output density, and in addition, in which the increase of the internal resistance of the battery owing to the deterioration of the electrode active materials is suppressed.

The invention claimed is:

1. A secondary battery electrode comprising:
   a current collector;
   a first electrode active material layer containing spinel-structured lithium manganate as an electrode active material, the electrode active material being distributed homogeneously through the layer, and being disposed in contact with the current collector; and
   a second electrode active material layer containing, as the electrode active material, a composite oxide represented by a following Chemical formula (1), and being stacked on the first electrode active material layer in a thickness direction of the secondary battery electrode, the composite oxide being distributed homogeneously through the layer,
   wherein an average particle diameter of the composite oxide is smaller than an average particle diameter of the spinel-structured lithium manganate:

$$LiCo_vNi_xMn_yM_zO_2 \quad (1)$$

where M is at least one type selected from the group consisting of Al, Ga and In, V represents an atomic ratio of Co, and is in a range of: $0 \le V \le 0.5$, X represents an atomic ratio of Ni, and is in a range of: $0.3 \le X < 1.0$, Y represents an atomic ratio of Mn, and is in a range of: $0 \le Y \le 0.5$, Z represents an atomic ratio of M, and is in a range of: $0 \le Z \le 0.1$, and v+x+y+z is equal to 1, and
   wherein the composite oxide comprises LiNi$_{0.8}$Co$_{0.15}$Al$_{0.05}$O$_2$.

2. The secondary battery electrode according to claim 1, wherein the average particle diameter of the composite oxide is 1/1000 to 1/3 of the average particle diameter of the spinel-structured lithium manganate.

3. The secondary battery electrode according to claim 1, wherein the average particle diameter of the composite oxide is 1/50 to 1/5 of the average particle diameter of the spinel-structured lithium manganate.

4. The secondary battery electrode according to claim 1, wherein a thickness of the second electrode active material layer is 2 to 30% of a thickness of the first electrode active material layer.

5. A secondary battery comprising:
   the secondary battery electrode according to claim 1 as a positive electrode.

6. The secondary battery according to claim 5, further comprising:
   a negative electrode containing carbon as a negative electrode active material.

7. An assembled battery comprising:
   a plurality of the secondary batteries according to claim 5 connected to one another.

8. A vehicle comprising:
   the secondary battery according to claim 5.

9. The secondary battery electrode according to claim 2, wherein a thickness of the second electrode active material layer is 2 to 30% of a thickness of the first electrode active material layer.

10. The secondary battery electrode according to claim 3, wherein a thickness of the second electrode active material layer is 2 to 30% of a thickness of the first electrode active material layer.

11. A secondary battery comprising:
    the secondary battery electrode according to claim 2 as a positive electrode.

12. A secondary battery comprising:
    the secondary battery electrode according to claim 3 as a positive electrode.

13. A secondary battery comprising:
    the secondary battery electrode according to claim 4 as a positive electrode.

14. An assembled battery comprising:
    a plurality of the secondary batteries according to claim 6 to one another.

15. A vehicle comprising:
    the secondary battery according to claim 6.

16. A vehicle comprising:
    the assembled battery according to claim 7.

17. The secondary battery electrode according to claim 1, wherein the average particle diameter of the composite oxide is within a range of 0.01 to 5 μm, and the average particle diameter of the spinel-structured lithium manganate is with a range of 5 to 100 μm.

18. The secondary battery electrode according to claim 1, wherein a content of the composite oxide in the second electrode active material layer is 40 to 90mass % with respect to a dry weight of the second electrode active material layer, and a content of the spinel-structured lithium manganate in the first electrode active material layer is 90 to 98 mass % with respect to a dry weight of the first electrode active material layer.

19. The secondary battery electrode according to claim 4, wherein the thickness of the second electrode active material layer is 0.6 to 90 μm, and the thickness of the first electrode active material layer is 30 to 300 μm.

\* \* \* \* \*